(12) United States Patent
Zhao et al.

(10) Patent No.: US 12,047,586 B2
(45) Date of Patent: Jul. 23, 2024

(54) METHOD AND APPARATUS FOR INTER PREDICTION MODE DEPENDENT SCALING FACTORS

(71) Applicant: TENCENT AMERICA LLC, Palo Alto, CA (US)

(72) Inventors: Liang Zhao, Sunnyvale, CA (US); Xin Zhao, San Jose, CA (US); Han Gao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 77 days.

(21) Appl. No.: 17/982,946

(22) Filed: Nov. 8, 2022

(65) Prior Publication Data

US 2024/0031594 A1    Jan. 25, 2024

Related U.S. Application Data

(60) Provisional application No. 63/390,910, filed on Jul. 20, 2022.

(51) Int. Cl.
*H04N 19/159* (2014.01)
*H04N 19/139* (2014.01)
(Continued)

(52) U.S. Cl.
CPC ......... *H04N 19/159* (2014.11); *H04N 19/139* (2014.11); *H04N 19/172* (2014.11);
(Continued)

(58) Field of Classification Search
None
See application file for complete search history.

(56) References Cited

U.S. PATENT DOCUMENTS

2018/0278951 A1    9/2018 Seregin et al.
2019/0089975 A1    3/2019 Liu et al.
(Continued)

FOREIGN PATENT DOCUMENTS

WO    2020/125750 A1    6/2020

OTHER PUBLICATIONS

International Search Report dated Mar. 10, 2023 in PCT/US2022/049508.

(Continued)

*Primary Examiner* — David N Werner
(74) *Attorney, Agent, or Firm* — Sughrue Mion, PLLC

(57) ABSTRACT

A method performed by a video decoder includes receiving a coded video bitstream including a current picture, a first reference picture, a second reference picture, and a joint motion vector difference (JMVD) associated with at least one block in the current picture. The method includes determining whether one or more scaling factors are used for an adaptive motion vector difference resolution (AMVD) based JMVD based on a predetermined condition. The method includes, in response to determining the one or more scaling factors are used for the AMVD based JMVD, scaling the JMVD based on the one or more scaling factors. The method includes deriving a first MVD for the first reference picture based on the scaled JMVD. The method includes deriving a second MVD for the second reference picture based on the derived first MVD. The method includes reconstructing the at least one block based on the derived first MVD and the derived second MVD.

20 Claims, 10 Drawing Sheets

(51) Int. Cl.
*H04N 19/172* (2014.01)
*H04N 19/176* (2014.01)
*H04N 19/30* (2014.01)
*H04N 19/46* (2014.01)
*H04N 19/52* (2014.01)
*H04N 19/577* (2014.01)
*H04N 19/44* (2014.01)

(52) U.S. Cl.
CPC ........... *H04N 19/176* (2014.11); *H04N 19/30* (2014.11); *H04N 19/46* (2014.11); *H04N 19/52* (2014.11); *H04N 19/577* (2014.11); *H04N 19/44* (2014.11)

(56) References Cited

U.S. PATENT DOCUMENTS

| | | | |
|---|---|---|---|
| 2019/0098331 A1 | 3/2019 | Wennersten et al. | |
| 2020/0280732 A1 | 9/2020 | Liu | |
| 2021/0314623 A1* | 10/2021 | Chang | H04N 19/136 |
| 2021/0377559 A1* | 12/2021 | Liu | H04N 19/159 |
| 2022/0124344 A1 | 4/2022 | Park et al. | |
| 2023/0128313 A1* | 4/2023 | Zhao | H04N 19/176 |
| | | | 375/240.02 |
| 2023/0254502 A1* | 8/2023 | Zhao | H04N 19/52 |
| | | | 375/240.02 |
| 2023/0300363 A1* | 9/2023 | Zhao | H04N 19/57 |
| | | | 375/240.16 |
| 2023/0328227 A1* | 10/2023 | Zhao | H04N 19/132 |
| 2023/0336771 A1* | 10/2023 | Zhao | H04N 19/52 |
| 2023/0412816 A1* | 12/2023 | Zhao | H04N 19/137 |

OTHER PUBLICATIONS

Written Opinion dated Mar. 10, 2023 in PCT/US2022/049508.
Lester Lu et al., "Optical Flow Motion Vector Refinement for AV2", Alliance for Open Media Codec Working Group, Sep. 20, 2021.
Xin Zhao et al., "Tool Description for AV1 and libaom", Alliance for Open Media Codec Working Group, Oct. 4, 2021.
Leo Zhao et al., "Advance motion vector difference coding", Alliance for Open Media, Codec Working Group, Nov. 24, 2021.
Peter de Rivaz, "AV1 Bitstream & Decoding Process Specification", The Alliance for Open Media, Jan. 8, 2019.
Yue Chen et al., "An Overview of Core Coding Tools in the AV1 Cideo Codec", PCS, 2018, pp. 41-45.
Elliott Karpilobsky et al., "Proposal: New Inter Modes for AV2", Alliance for Open Media, Codec Working Group, Feb. 24, 2021.
Leo Zhao et al., "Improved adaptive MVD resolution", Alliance for Open Media, Codec Working Group, Feb. 9, 2022.
Benjamine Bross et al., "Versatile Video Coding Editorial Refinements on Draft 10", Joint Video Experts Team (JVET), ITU-T 16 WP and ISO/IEC JTC 1/SC 29, Oct. 2020, 512 Pages.

* cited by examiner

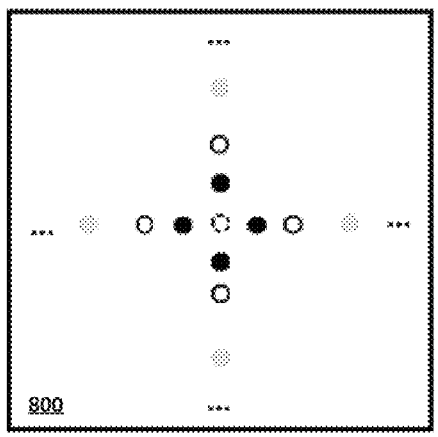 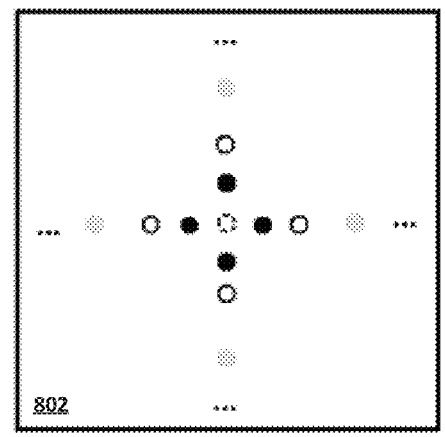
FIG. 8

FIG. 9    900

METHOD AND APPARATUS FOR INTER PREDICTION MODE DEPENDENT SCALING FACTORS

CROSS-REFERENCE TO RELATED APPLICATION

This application is based on and claims priority to U.S. Provisional Patent Application No. 63/390,910, filed on Jul. 20, 2022, the disclosure of which is incorporated by reference herein in its entirety.

TECHNICAL FIELD

The present disclosure relates generally to communication systems, and more particularly to methods and apparatuses for inter prediction mode dependent scaling factors.

BACKGROUND

AOMedia Video 1 (AV1) is an open video coding format designed for video transmissions over the Internet. This coding format was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. The current coding standards, when selecting a scaling factor for a motion vector difference (MVD) applied to two frames, do not adequately account for non-linear motions between the two frames.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for inter prediction mode dependent scaling factors are disclosed by the present disclosure.

According to an exemplary embodiment, a method performed by at least one processor of a video decoder includes receiving a coded video bitstream including a current picture, a first reference picture, a second reference picture, and a joint motion vector difference (JMVD) associated with at least one block in the current picture. The method further includes determining whether one or more scaling factors are used for an adaptive motion vector difference resolution (AMVD) based JMVD based on a predetermined condition. The method further includes, in response to determining the one or more scaling factors are used for the AMVD based JMVD, scaling the JMVD based on the one or more scaling factors. The method further includes deriving a first MVD for the first reference picture based on the scaled JMVD. The method further includes deriving a second MVD for the second reference picture based on the derived first MVD. The method further includes reconstructing the at least one block based on the derived first MVD and the derived second MVD.

According to an exemplary embodiment, a video decoder includes at least one memory configured to store computer program code, and at least one processor configured to access the computer program code and operate as instructed by the computer program code. The computer program code includes receiving code configured to cause the at least one processor to receive a coded video bitstream including a current picture, a first reference picture, a second reference picture, and a joint motion vector difference (JMVD) associated with at least one block in the current picture. The computer program code further includes determining code configured to cause the at least one processor to determine whether one or more scaling factors are used for an adaptive motion vector difference resolution (AMVD) based JMVD based on a predetermined condition. The computer program code further includes scaling code configured to cause the at least one processor to scale the JMVD based on the one or more scaling factors in response to determining the one or more scaling factors are used for the AMVD based JMVD. The computer program code further includes first deriving code configured to cause the at least one processor to derive a first MVD for the first reference picture based on the scaled JMVD. The computer program code further includes second deriving code configured to cause the at least one processor to derive a second MVD for the second reference picture based on the derived first MVD. The computer program code further includes reconstructing code configured to cause the at least one processor to reconstruct the at least one block based on the derived first MVD and the derived second MVD.

According to an exemplary embodiment, a non-transitory computer readable medium having instructions stored therein, which when executed by a processor of a video decoder cause the processor to execute a method that includes receiving a coded video bitstream including a current picture, a first reference picture, a second reference picture, and a joint motion vector difference (JMVD) associated with at least one block in the current picture. The method further includes determining whether one or more scaling factors are used for an adaptive motion vector difference resolution (AMVD) based JMVD based on a predetermined condition. The method further includes, in response to determining the one or more scaling factors are used for the AMVD based JMVD, scaling the JMVD based on the one or more scaling factors. The method further includes deriving a first MVD for the first reference picture based on the scaled JMVD. The method further includes deriving a second MVD for the second reference picture based on the derived first MVD. The method further includes reconstructing the at least one block based on the derived first MVD and the derived second MVD.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 8 illustrates examples merge mode motion vector difference (MMVD) search points, in accordance with various embodiments of the present disclosure.

DETAILED DESCRIPTION

Figure 1:
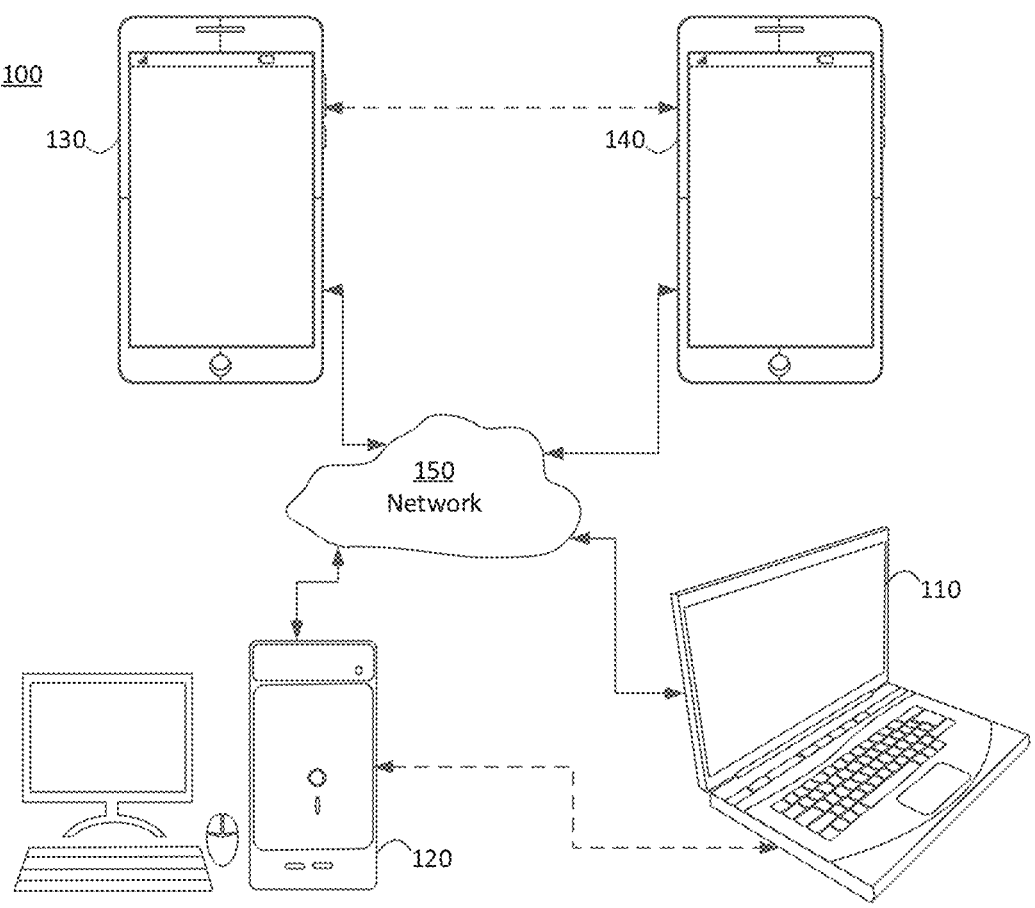
FIG. 1 is a schematic illustration of a block diagram of a communication system, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
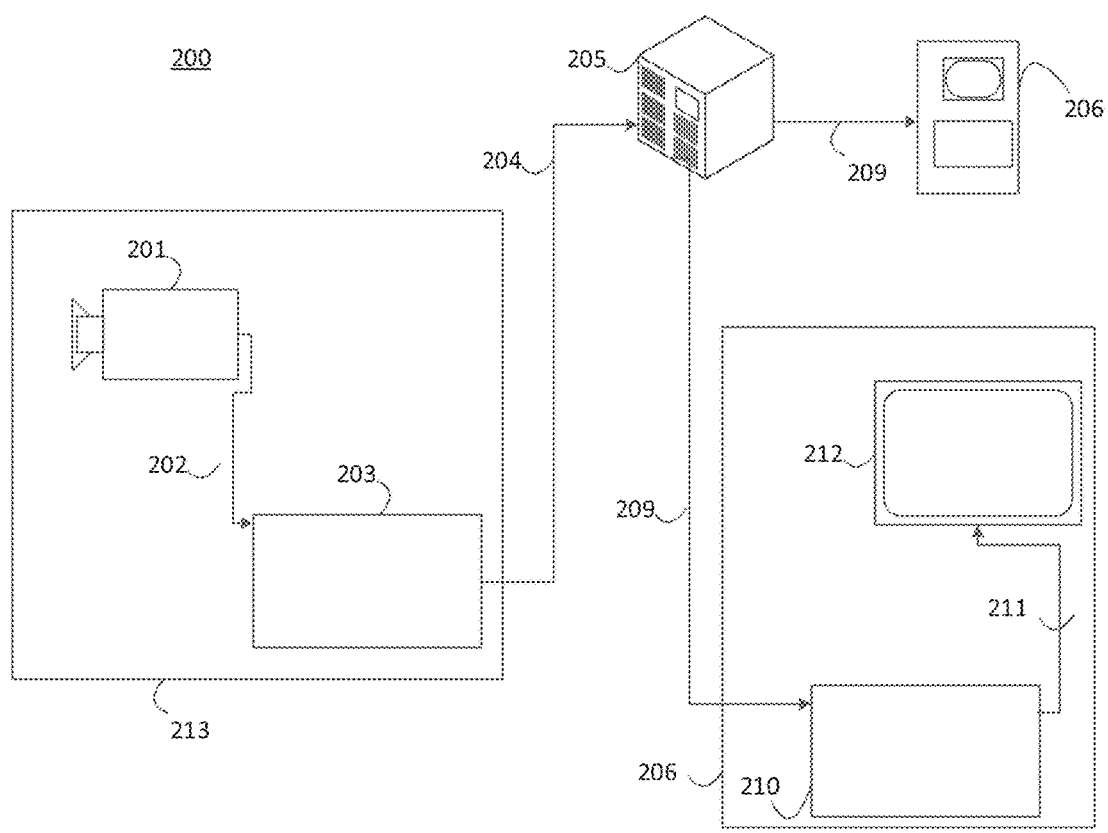
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that may include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the camera (201). The encoder (203) may include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) may access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) may include a video decoder (210) and a display (212). The video decoder (210) may, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
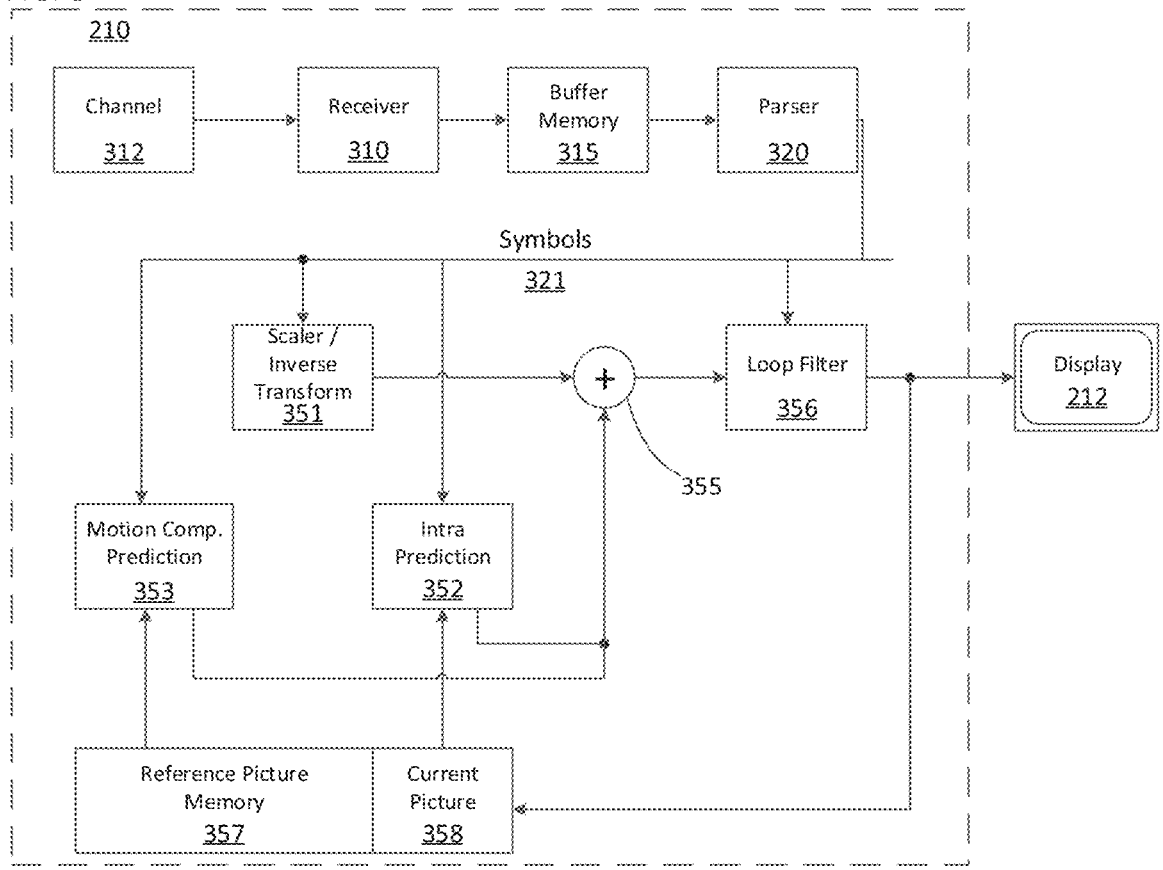
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ) In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SET) messages or Video Usability Information (VUI) parameter set fragments (not depicted). The parser (320) may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) may involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) may output blocks including sample values that may be input into the aggregator (355).

In some cases, the output samples of the scaler/inverse transform (351) may pertain to an intra coded block; that is: a block that is not using predictive information from previously reconstructed pictures, but may use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) may pertain to an inter coded, and potentially motion compensated block. In such a case, a Motion Compensation Prediction unit (353) may access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that may have, for example, X, Y, and reference picture components. Motion compensation also may include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies may include in-loop filter technologies that are controlled by parameters included in the coded video bitstream and made available to the loop filter unit (356) as symbols (321) from the parser (320), but may also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels may, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
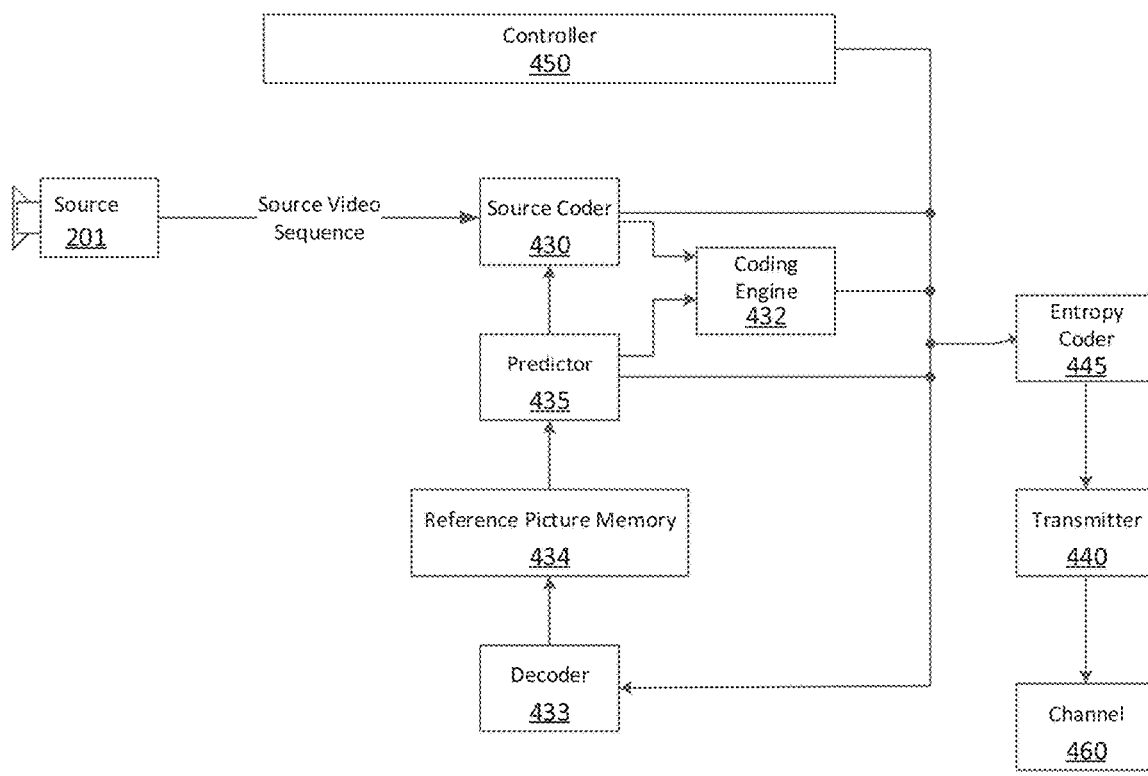
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203). The video source (201) may provide the source video sequence to be coded by the encoder (203) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel may include one or more sample depending on the sampling structure, color space, etc. in use. A person skilled in the art may readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) may include rate control related parameters (picture skip, quantizer, lambda value of rate-distortion optimization techniques, . . . ), picture size, group of pictures (GOP) layout, maximum motion vector search range, and so forth. A person skilled in the art may readily identify other functions of controller (450) as they may pertain to video encoder (203) optimized for a certain system design.

Some video encoders operate in what a person skilled in the are readily recognizes as a "coding loop". As an over-simplified description, a coding loop may consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity may not be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

VP9 uses a 4-way partition tree starting from a 64×64 level down to 4×4 level, with some additional restrictions for blocks 8×8 and below as shown in the top half of FIG. 5, which illustrates a partitioning of a 64×64 block (500). The partitions designated as R refer to recursive partitioning in which the same partition tree is repeated at a lower scale until the lowest 4×4 level is reached.

Figure 5:
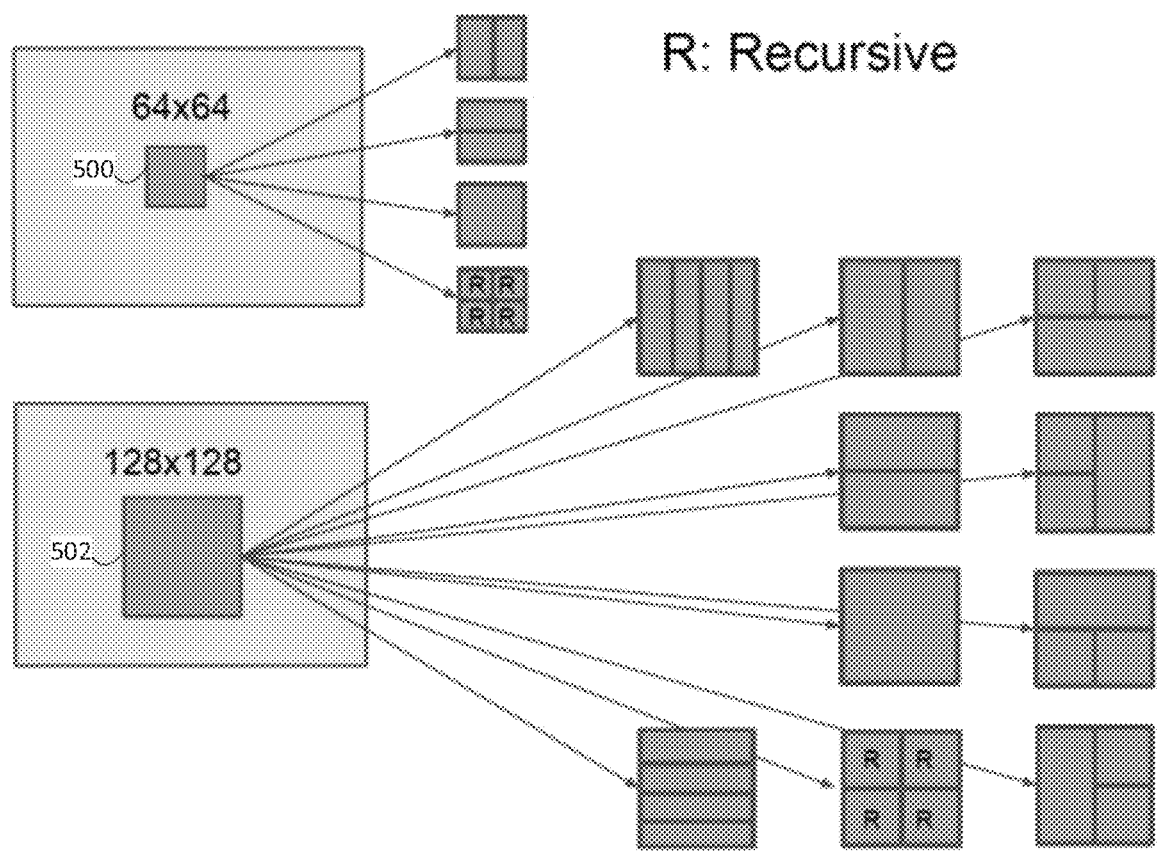
FIG. 5 illustrates example partition trees, in accordance with various embodiments of the present disclosure.

AV1 not only expands the partition-tree to a 10-way structure as shown in FIG. 5, but also increases the largest size (referred to as superblock in VP9/AV1 parlance) to start from a 128×128 block (502). This partitioning includes 4:1/1:4 rectangular partitions that did not exist in VP9. None of the rectangular partitions may be further subdivided. In addition, AV1 adds more flexibility to the use of partitions below the 8×8 level, in the sense that a 2×2 chroma inter prediction now becomes possible in certain cases.

In HEVC, a coding tree unit (CTU) may be split into coding units (CUs) by using a quadtree structure denoted as coding tree to adapt to various local characteristics. The decision on whether to code a picture area using inter-picture (temporal) or intra-picture (spatial) prediction may be made at the CU level. Each CU may be further split into one, two, or four prediction units (PUs) according to the PU splitting type. Inside one PU, the same prediction process may be applied, and the relevant information may be transmitted to the decoder on a PU basis. After obtaining the residual block by applying the prediction process based on the PU splitting type, a CU may be partitioned into transform units (TUs) according to another quadtree structure like the coding tree for the CU. One of key features of the HEVC structure is that this structure has the multiple partition conceptions including CU, PU, and TU. In HEVC a CU or a TU may only be square shape, while a PU may be square or rectangular shape for an inter predicted block. In HEVC, one coding block may be further split into four square sub-blocks, and a transform may be performed on each sub-block (e.g., TU). Each TU may be further split recursively (e.g., using quadtree split) into smaller TUs, which is called Residual Quad-Tree (RQT). At a picture boundary, HEVC may employ an implicit quad-tree split so that a block will keep quad-tree splitting until the size fits the picture boundary.

In HEVC, a CTU may be split into CUs by using a quadtree structure denoted as coding tree to adapt to various local characteristics. The decision on whether to code a picture area using inter-picture (temporal) or intra-picture (spatial) prediction may be made at the CU level. Each CU may be further split into one, two, or four PUs according to the PU splitting type. Inside one PU, the same prediction process may be applied and the relevant information is transmitted to the decoder on a PU basis. After obtaining the residual block by applying the prediction process based on the PU splitting type, a CU may be partitioned into transform units (TUs) according to another quadtree structure like the coding tree for the CU. One of key features of the HEVC structure is that this structure has the multiple partition conceptions including CU, PU, and TU.

Figure 6A:
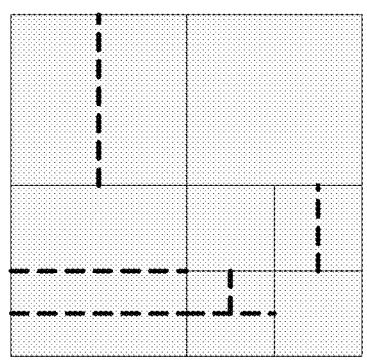
FIGS. 6(A) and 6(B) illustrate an example quad-tree binary tree (QTBT) structure, in accordance with various embodiments of the present disclosure.

The QTBT structure may remove the concepts of multiple partition types (e.g. QTBT structure removes the separation of the CU, PU, and TU concepts), and supports more flexibility for CU partition shapes. In the QTBT block structure, a CU may have either a square or rectangular shape. As shown in FIGS. 6(A) and (6B), a coding tree unit (CTU) may be first partitioned by a quadtree structure. The quadtree leaf nodes may be further partitioned by a binary tree structure. There may two splitting types in the binary tree splitting, symmetric horizontal splitting and symmetric vertical splitting. The binary tree leaf nodes may be called coding units (CUs), and that segmentation may be used for prediction and transform processing without any further partitioning. This means that the CU, PU, and TU have the same block size in the QTBT coding block structure. In the JEM, a CU sometimes consists of coding blocks (CBs) of different colour components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices.

The following parameters are defined for the QTBT partitioning scheme:
 CTU size: the root node size of a quadtree, the same concept as in HEVC
 MinQTSize: the minimum allowed quadtree leaf node size
 MaxBTSize: the maximum allowed binary tree root node size
 MaxBTDepth: the maximum allowed binary tree depth
 MinBTSize: the minimum allowed binary tree leaf node size In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from 16×16 (e.g., the MinQTSize) to 128×128 (e.g., the CTU size). If the leaf quadtree node is 128×128, the node may not be further split by the binary tree since the size exceeds the MaxBTSize (e.g., 64×64). Otherwise, the leaf quadtree node may be further partitioned by the binary tree. Therefore, the quadtree leaf node may also be the root node for the binary tree with the binary tree depth as 0. When the binary tree depth reaches MaxBTDepth (e.g., 4), no further splitting is considered. When the binary tree node has a width equal to MinBTSize (e.g., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 2568256 luma samples.

Figure 6B:
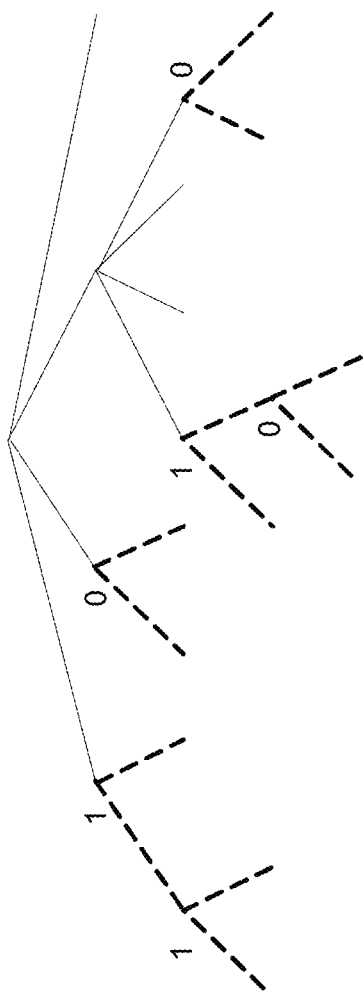

FIG. 6(A) illustrates an example of block partitioning by using QTBT, and FIG. 6(B) illustrates the corresponding tree representation. The solid lines indicate quadtree splitting and dotted lines indicate binary tree splitting. In each splitting (e.g., non-leaf) node of the binary tree, one flag may be signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme may support the flexibility for the luma and chroma to have a separate QTBT structure. Currently, for P and B slices, the luma and chroma CTBs in one CTU share the same QTBT structure. However, for I slices, the luma CTB may be partitioned into CUs by a QTBT structure, and the chroma CTBs may be partitioned into chroma CUs by another QTBT structure. This means that a CU in an I slice may consist of a coding block of the luma component or coding blocks of two chroma components, and a CU in a P or B slice may consist of coding blocks of all three colour components.

In HEVC, inter prediction for small blocks may be restricted to reduce the memory access of motion compensation, such that bi-prediction is not supported for 488 and 884 blocks, and inter prediction is not supported for 484 blocks. In the QTBT as implemented in the JEM-7.0, these restrictions may be removed.

Figure 7B:
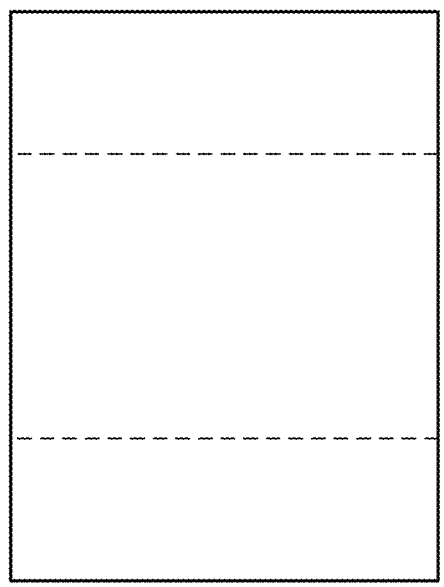
FIGS. 7(A) and 7(B) illustrate a ternary tree (TT) structure, in accordance with various embodiments of the present disclosure.
Figure 7A:
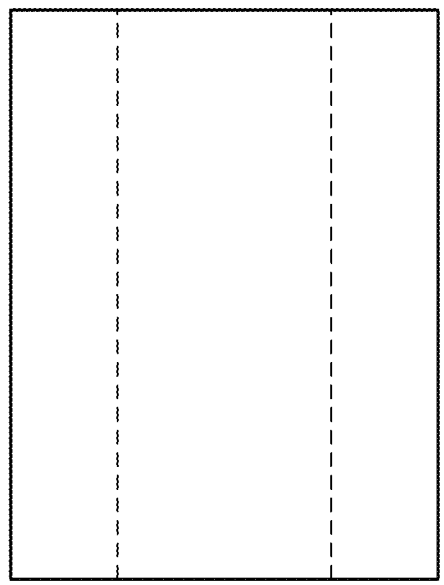

In VVC, a Multi-type-tree (MTT) structure may be included, which further adds the horizontal and vertical center-side triple-trees on top of QTBT, as shown in FIGS. 7(A) and 7(B).

The key benefits of the triple-tree partitioning include (i) complement to quad-tree and binary-tree partitioning: triple-tree partitioning is able to capture objects which locate in block center while quad-tree and binary-tree are always splitting along block center; and (ii) the width and height of the partitions of the proposed triple trees are always power of 2 so that no additional transforms are needed. The design of two-level tree is mainly motivated by complexity reduction. The complexity of traversing of a tree is $T^D$, where T denotes the number of split types, and D is the depth of tree.

In addition to merge mode, where the implicitly derived motion information is directly used for prediction samples generation of the current CU, the merge mode with motion vector differences (MMVD) is introduced in VVC. A MMVD flag may be signalled right after sending a skip flag and merge flag to specify whether MMVD mode is used for a CU. In MMVD, after a merge candidate is selected, the merge candidate is further refined by the information of the signalled MVD. This further information may include a merge candidate flag, an index to specify motion magnitude, and an index for indication of motion direction. In the MMVD mode, one for the first two candidates in the merge list may be selected to be used as a MV basis. The merge candidate flag may be signalled to specify which one is used.

Distance index specifies motion magnitude information and indicates the pre-defined offset from the starting point. As shown in FIG. 8 an offset is added to either horizontal component or vertical component of starting MV in L0 reference picture (800) and the L1 reference picture (802) FIG. 8. The relation of distance index and pre-defined offset is specified in Table 1.

TABLE 1

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index may represent the direction of the MVD relative to the starting point. The direction index may represent one of the four directions shown in Table 2, which shows a sign of a MV offset specified by the direction index.

TABLE 2

| Direction IDX | 00 | 01 | 10 | 11 |
|---|---|---|---|---|
| x-axis | + | − | N/A | N/A |
| y-axis | N/A | N/A | + | − |

The meaning of the MVD sign may be variant according to the information of the starting MVs. When the starting MVs is an uni-prediction MV or bi-prediction MVs in which both lists point to the same side of the current picture (e.g., POCs of two references are both larger than the POC of the current picture, or are both smaller than the POC of the current picture), the sign in Table 2 may specify the sign of the MV offset added to the starting MV. When the starting MVs are bi-prediction MVs with the two MVs pointing to the different sides of the current picture (e.g., the POC of one reference is larger than the POC of the current picture, and the POC of the other reference is smaller than the POC of the current picture), and the difference of the POC in list 0 is greater than the one in list 1, the sign in Table 2 may specify the sign of the MV offset added to the list 0 MV component of the starting MV, and the sign for the list 1 MV has an opposite value. Otherwise, if the difference of the POC in list 1 is greater than list 0, the sign in Table 2 may specify the sign of the MV offset added to the list 1 MV component of the starting MV, and the sign for the list 0 MV has an opposite value.

The MVD may be scaled according to the difference of POCs in each direction. If the differences of the POCs in both lists are the same, no scaling is needed. Otherwise, if the difference of the POC in list 0 is larger than the one of list 1, the MVD for list 1 may be scaled. If the POC difference of L1 is greater than L0, the MVD for list 0 may be scaled in the same way. If the starting MV is uni-predicted, the MVD may be added to the available MV.

In VVC, besides the normal unidirectional prediction and bi-directional prediction mode MVD signalling, symmetric MVD mode for bi-directional MVD signalling may applied. In the symmetric MVD mode, motion information including reference picture indices of both list-0 and list-1 and MVD of list-1 are not signaled, but instead may be derived. The decoding process of the symmetric MVD mode is as follows.

First, at the slice level, variables BiDirPredFlag, RefIdxSymL0 and RefIdxSymL1 may be derived as follows:
  If mvd_l1_zero_flag is 1, BiDirPredFlag is set equal to 0.
  Otherwise, if the nearest reference picture in list 0 and the nearest reference picture in list 1 form a forward and backward pair of reference pictures or a backward and forward pair of reference pictures, BiDirPredFlag is set to 1, and both list 0 and list 1 reference pictures are short-term reference pictures. Otherwise BiDirPredFlag is set to 0.

Second, at CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0 flag, mvp_l1_flag and MVD0 may be explicitly signaled. The reference indices for list 0 and list 1 may be set equal to the pair of reference pictures, respectively. MVD1 may be set equal to (−MVD0).

In AV1, for each coded block in inter frame, if the mode of current block is not skip mode but inter-coded mode, then another flag may be signaled to indicate whether single reference mode or compound reference mode is used to current block, where the prediction block may be generated by one motion vector in the single reference mode, whereas the prediction block may be generated by weighted averaging two prediction blocks derived from two motion vectors in the compound reference mode.

For a single reference case, one or more of the following modes may be signaled:

NEARMV—use one of the motion vector predictors (MVP) in the list indicated by a DRL (Dynamic Reference List) index.

NEWMV—use one of the motion vector predictors (MVP) in the list signaled by a DRL index as reference and apply a delta to the MVP.

GLOBALMV—use a motion vector based on frame-level global motion parameters.

For compound reference modes, the following modes may be signaled:

NEAR_NEARMV—use one of the motion vector predictors (MVP) in the list signaled by a DRL index.

NEAR_NEWMV—use one of the motion vector predictors (MVP) in the list signaled by a DRL index as reference and send a delta MV for the second MV.

NEW_NEARMV—use one of the motion vector predictors (MVP) in the list signaled by a DRL index as reference and send a delta MV for the first MV.

NEW_NEWMV—use one of the motion vector predictors (MVP) in the list signaled by a DRL index as reference and send a delta MV for both MVs.

GLOBAL_GLOBALMV—use MVs from each reference based on their frame-level global motion parameters.

AV1 allows ⅛ pixel motion vector precision (or accuracy), and the following syntaxes may be used to signal the motion vector difference in reference frame list 0 or list 1:

mv joint specifies which components of the motion vector difference are non-zero
  0 indicates there is no non-zero MVD along either horizontal or vertical direction
  1 indicates there is non-zero MVD only along horizontal direction
  2 indicates there is non-zero MVD only along vertical direction
  3 indicates there is non-zero MVD along both horizontal and vertical direction mv_sign specifies whether motion vector difference is positive or negative mv_class specifies the class of the motion vector difference.

mv_bit specifies the integer part of the offset between motion vector difference and starting magnitude of each MV class mv_fr specifies the first 2 fractional bits of the motion vector difference mv_hp specifies the third fractional bit of the motion vector difference As shown in Table 3, which shows a magnitude class for a MVD, a higher class may mean that the motion vector difference has a larger magnitude.

TABLE 3

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

For NEW_NEARMV and NEAR_NEWMV mode, the precision of the MVD may depend on the associated class and the magnitude of MVD. First, a fractional MVD may only be allowed only if the MVD magnitude is equal to or less than one-pixel. Second, only one MVD value may be allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). Furthermore, if the current block is coded as the NEW_NEARMV or NEAR_NEWMV mode, one context may be used for signaling mv joint or mv_class. Otherwise, another context may be used for signaling mv joint or mv_class.

The allowed MVD values in each MV class are illustrated in Table 4.

TABLE 4

| MV class | Magnitude of MVD |
| --- | --- |
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {024} |
| MV_CLASS_10 | {2048} |

A new inter coded mode, named as JOINT_NEWMV, may be applied to indicate whether the MVDs for two reference lists are jointly signaled. If the inter prediction mode is equal to JOINT_NEWMV mode, MVDs for reference list 0 and reference list 1 may be jointly signaled. Therefore, under this mode, only one MVD, named as joint_mvd, may be signaled and transmitted to the decoder, and the delta MVs for reference list 0 and reference list 1 may be derived from the joint_mvd. JOINT_NEWMV mode may be signaled together with NEAR_NEARMV, NEAR_NEWMV, NEW_NEARMV, NEW_NEWMV, and GLOBAL_GLOBALMV mode. No additional contexts are added.

When the JOINT_NEWMV mode is signaled, and the POC distance between two reference frames and current frame is different, the MVD may be scaled for reference list 0 or reference list 1 based on the POC distance. Specifically, the distance between reference frame list 0 and current frame is noted as td0 and the distance between reference frame list 1 and current frame is noted as td1. If td0 is equal to or larger than td1, the joint_mvd may be directly used for reference list 0, and the mvd for reference list 1 may be derived from joint_mvd as follows:

$$\text{derived\_mvd} = \frac{td1}{td0} * \text{joint\_mvd} \quad \text{Eq. (1)}$$

Otherwise, if td1 is equal to or larger than td0, the joint_mvd is directly used for reference list 1 and the mvd for reference list 0 is derived from joint_mvd as follows:

$$\text{derived\_mvd} = \frac{td0}{td1} * \text{joint\_mvd} \quad \text{Eq. (2)}$$

A new inter coded mode, named as AMVDMV, is added to single reference cases. When AMVDMV mode is selected, this mode may indicate that AMVD is applied to signal MVD. One flag, named as amvd_flag, may be added under the JOINT_NEWMV mode to indicate whether the AMVD is applied to the joint MVD coding mode or not. When adaptive MVD resolution is applied to the joint MVD coding mode, also named as joint AMVD coding mode, the MVD for two reference frames may be jointly signaled, and the precision of the MVD may be implicitly determined by the MVD magnitudes. Otherwise, the MVD for two (or more than two) reference frames may be jointly signaled, and conventional MVD coding is applied.

The AMVR was initially proposed in CWG-0012 where a total of 7 MV precisions (8, 4, 2, 1, ½, ¼, ⅛) are supported. For each prediction block, the AVM encoder searches all the supported precision values and signals the best precision to the decoder. To reduce the encoder runtime, two precision sets are supported. Each precision set may contain 4-predefined precisions. The precision set may be adaptively selected at the frame level based on the value of maximum precision of the frame. Same as AV1, the maximum precision may be signaled in the frame header. Table 5 summarizes the supported precision values based on the frame level maximum precision.

TABLE 5

| Frame level maximum precision | Supported MV precisions |
| --- | --- |
| 1/8 | 1/8, 1/2, 1, 4 |
| ¼ | 1/4, 1, 4, 8 |

In current AVM software (similar to AV1), there is a frame level flag to indicate if the MVs of the frame contains sub-pel precisions or not. The AMVR may be enabled only if the value of cur_frame_force_integer_mv flag is 0. In the AMVR, if the precision of the block is lower than the maximum precision, motion model and interpolation filters are not signaled. If the precision of a block is lower than the maximum precision, the motion mode may be inferred to a translation motion, and the interpolation filter may be inferred to REGULAR interpolation filter. Similarly, if the precision of the block is either 4-pel or 8-pel, inter-intra mode may not signaled and inferred to be 0.

For joint MVD coding mode (JMVD), there is an assumption that there is linear motion between the backward reference frame and the forward reference frame. When joint MVD coding mode is selected for one block, one joint MVD may be signaled for both reference frames, and the MVD for the two reference frames may be derived from the joint MVD based on the distance between reference frames and current frame. However, the motion between two reference frames may not be always linear motion. For example, the motion may become slower or faster from the backward reference frame to the forward reference frame.

For AMVD based JMVD, the MVD may only be applied along either the horizontal or vertical direction. However, for conventional JMVD, the MVD may be along both the horizontal and vertical directions. Therefore, sharing the same scaling factors among AMVD based JMVD and conventional JMVD is sub-optimal.

Embodiments of the present disclosure are directed to a set of advanced image and video coding technologies. More specifically, the embodiments of the present disclosure are directed to inter prediction mode dependent scaling factors. The embodiments of the present disclosure may be used separately or combined in any order. Further, each of the embodiments utilizing an encoder or a decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit (i.e., CU). The term block may also be used to refer to the transform block.

The direction of a reference frame may be determined by whether the reference frame is prior to the current frame in a display order or after the current frame in the display order. The terms x-axis and y-axis may refer to the horizontal and vertical component of a 2-D value, and may be replaced by another two axes along two pre-defined directions that are perpendicular to each other, where the same embodiments are also applicable to these other axes. For example, the x-axis and y-axis may be replaced by a 45-degree axis and 135-degree axis, respectively. The conventional JMVD may refer to JMVD with regular full MV resolution, or JMVD with AMVR.

In some embodiments, when the MVD is jointly signaled for multiple reference frames in one block, flexible scaling factors may be used to derive the MVD for reference frame list 0 and/or 1 from the signaled joint MVD based on the signaled scaling factors in the bitstream or the coded information of current block (or neighboring blocks). The allowed/supported scaling factors may be different for AMVD based JMVD, and conventional JMVD mode with different MV precisions.

In some embodiments, the values of the scaling factors are restricted to power of 2, such as 1, 2, 4, ½, ¼.

In some embodiments, for AMVD based JMVD mode, the same scaling factors are applied to both vertical and horizontal components of the MVD for reference frame list 0 and/or 1.

In some embodiments, one pre-defined look-up table may be used to store the supported/allowed scaling factors, and the associated entry index for the selected scaling factor in the look-up table is signaled in the bitstream. Table 6 illustrates an example look-up table specifying a scaling factor for each index.

TABLE 6

| Index | Scaling factors for both x and y axes |
|---|---|
| 0 | 1 |
| 1 | 2 |
| 2 | 1/2 |

In some embodiments, the AMVD JMVD scaling factors may be extracted from the conventional JMVD scaling factors. That is, if AMVD is applied along the x-axis, the x-axis scaling factor of the conventional JMVD is used. Otherwise, if AMVD is applied along the y-axis, the y-axis scaling factor of the conventional JMVD is used.

In some embodiments, the AMVD JMVD scaling factors may be a subset of the extracted scaling factors from the conventional JMVD. For example, when the conventional JMVD mode is selected for one block, different scaling factors may be applied to the vertical component or horizontal component of the MVD for reference frame list 0 and/or 1 separately.

In some embodiments, one pre-defined look-up table may be used to store the supported/allowed scaling factor pairs for vertical component and horizontal component of the MVD in the conventional JMVD mode, and the associated entry index for the selected scaling factor pair in the look-up table may be signaled in the bitstream. Table 7 illustrates an example table in which a separate scaling factor is specified for each of the x-axis and the y-axis.

TABLE 7

| Index | Scaling factor for x-axis | Scaling factor for y-axis |
|---|---|---|
| 0 | 1 | 1 |
| 1 | 2 | 2 |
| 2 | ½ | ½ |
| 3 | 1 | 2 |
| 4 | 2 | 1 |
| 5 | 1 | ½ |
| 6 | ½ | 1 |

In some embodiments, the scaling factor for one component (either vertical component or horizontal component) of the MVD may be restricted to be 1, and the scaling factor for the other component of MVD may be other values such as 2 or ½. The supported scaling factor pairs are also stored in one look-up table, the associated entry index for the selected scaling factor pair in the look-up table is signaled in the bitstream. Table 8 illustrates an example look-up table in which the scaling factor for one of the x-axis and the y-axis is restricted to 1.

TABLE 8

| Index | Scaling factor for x-axis | Scaling factor for y-axis |
|---|---|---|
| 0 | 1 | 1 |
| 1 | 1 | 2 |
| 2 | 2 | 1 |
| 3 | 1 | ½ |
| 4 | ½ | 1 |

In some embodiments, the context for signaling the scaling factors may depend on the inter prediction mode information of current block. For example, if the current block is coded as the AMVD based JMVD mode, one context may be used to signal the scaling factor of the current block. Otherwise, another context may be used to signal the scaling factors of the current block. In another example, when the current block is coded as the conventional JMVD mode, to signal the scaling factor of the current block, one context may be used when AMVR is applied, and another context is used when AMVR is not applied.

In some embodiments, the context for signaling the scaling factors depends on the distance between the current frame and the reference frames of current frame. For example, if the distance between the reference frame and the current frame is equal to or greater than one threshold, one context may be used. Otherwise, another context may be used. As an example, the threshold is set to 4 or 8.

In some embodiments, the MV precision of the current block may be used as a context for signaling the scaling factors. For example, one context may be used for signaling the index of the scaling factor when the MV precision is equal to or greater than one threshold. Otherwise, another context may be used instead. As an example, the threshold may be set to 1 pel.

In some embodiments, the index of the scaling factor may be only signaled when the current block is coded as AMVD based JMVD mode. In some embodiments, the index of scaling factor is only signaled when optical flow refinement is applied to current block. In some embodiments, when the index of a scaling factor indicates that at least one of the scaling factors are not equal to 1, then the interpolation filter type is not signaled in the bitstream, but derived as one default interpolation filter type. For example, the default interpolation filter type may be one of the REGULAR, SMOOTH, or SHARP filter defined in AV1.

In some embodiments, when the index of the scaling factor indicates that at least one of the scaling factors is not equal to 1, only a subset to MV precision may be allowed or signaled into the bitstream. For example, when the index of the scaling factor indicates that at least one of the scaling factors is not equal to 1, the MV precision of current block may be finer than one threshold, such as 2 pel. In another example, when the index of scaling factor indicates that at least one of the scaling factors are not equal to 1, the MV precision for current block is not signaled but derived as one default value. In another example, when the index of the scaling factor indicates that at least one of the scaling factors is not equal to 1, the MV precision for current block may not be signaled but derived as the frame level MV precision or super block level MV precision. In some embodiments, the index of the scaling factor may be used as a context for signaling the MV precision of current block when current block is coded as the joint MVD mode.

Figure 9:
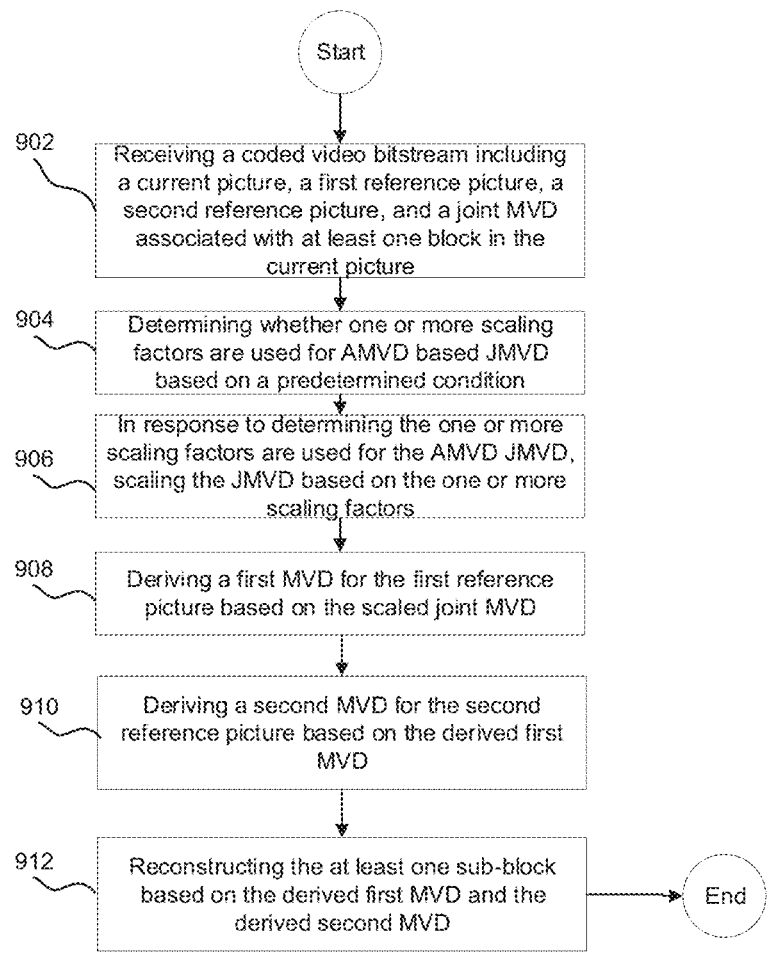
FIG. 9 illustrates a flow chart of an embodiment of a process for determining scaling factors for a joint motion vector difference (MVD), in accordance with various embodiments of the present disclosure.

FIG. 9 illustrates a flowchart of an embodiment of a process (900) for determining scaling factors for a joint MVD. The process (900) may be performed by a decoder such as decoder (210). The process may start at operation (902) where a coded video bitstream is received. The bitstream may include a current picture, a first reference picture, a second reference picture, and a joint MVD associated with at least one block in the current picture.

The process may proceed to operation (904) where it is determined whether one or more scaling factors are used for the AMVD based JMVD based on a predetermined condition such as a flag included in the received bitstream. The process proceeds to operation (906) wherein in response to determining the one or more scaling factors are used for the AMVD JMVD, the JMVD is scaled based on the one or more scaling factors. As an example, the scaling factors are determined based on an index value included in the bitstream that indexes a look-up table. The look-up table may specify a scaling factor that is applied to both the x-axis and the y-axis, or the look-up table may specify separate scaling factors applied to both the x-axis and the y-axis.

The process proceeds to operation (908) where a first MVD for the first reference picture is derived based on the scaled joint MVD. As an example, the first MVD may be determined as specified in Eq. (1). The process proceeds to operation (910) where a second MVD for the second reference picture is derived based on the derived first MVD. As an example, the second MVD may be determined as specified in Eq. (2). The process proceeds to operation (912) where the at least one sub-block is decoded based on the derived first MVD and the derived second MVD.

The techniques of embodiments of the present disclosure described above, may be implemented as computer software using computer-readable instructions and physically stored in one or more computer-readable media. For example, FIG. 10 shows a computer system (1000) suitable for implementing embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 10:
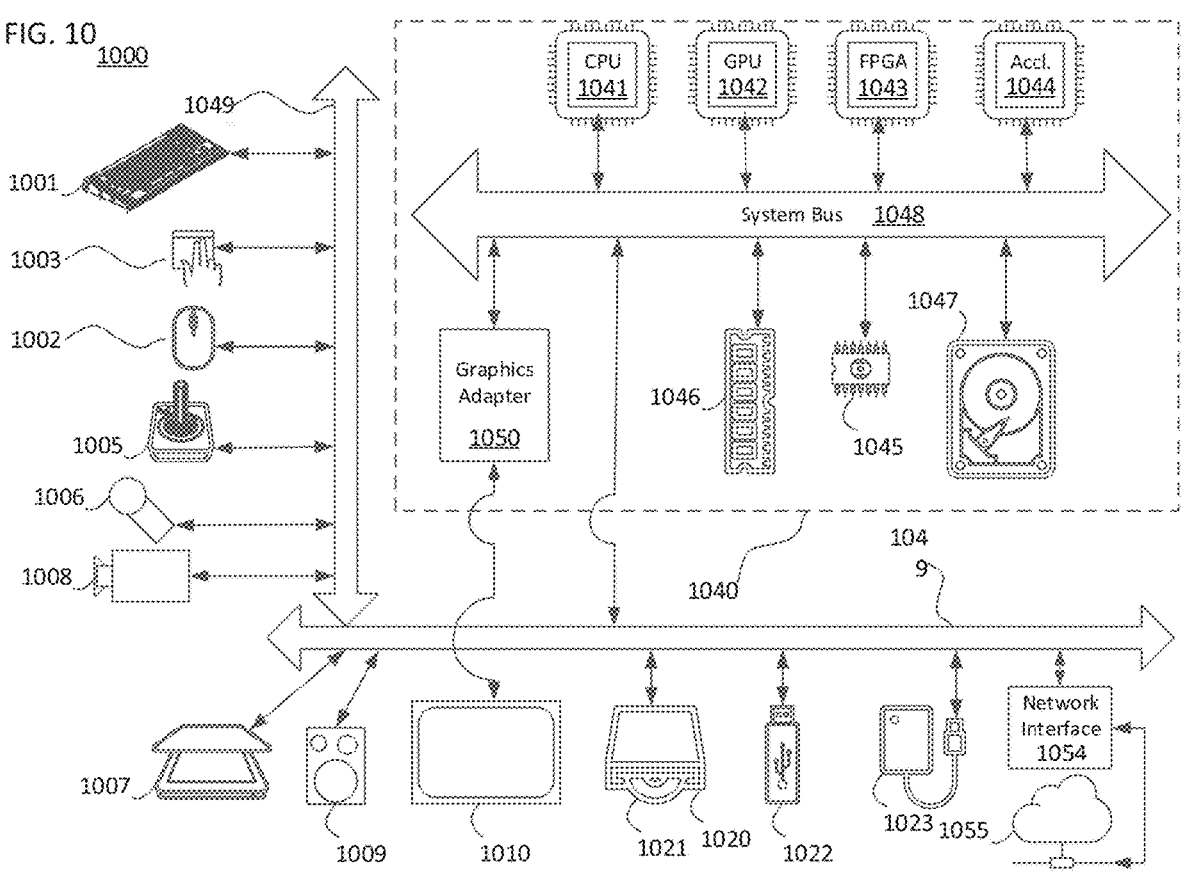
FIG. 10 illustrates an example computer system, in accordance with various embodiments of the present disclosure.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove, joystick (1005), microphone (1006), scanner (1007), and camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove, or joystick (1005), but there may also be tactile feedback devices that do not serve as input devices). For example, such devices may be audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) may also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000); others are commonly integrated into the core of the computer system 1000 by attachment to a system bus as described below (for example Ethernet interface into a PC computer system or cellular network interface into a smartphone computer system). Using any of these networks, computer system (1000) may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment (1055). Certain protocols and protocol stacks may be used on each of those networks and network interfaces as described above.

Aforementioned human interface devices, human-accessible storage devices, and network interfaces (1054) may be attached to a core (1040) of the computer system (1000).

The core (1040) may include one or more Central Processing Units (CPU) (1041), Graphics Processing Units (GPU) (1042), specialized programmable processing units in the form of Field Programmable Gate Areas (FPGA) (1043), hardware accelerators (1044) for certain tasks, and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) may be accessible in the form of one or more physical plugs to enable extensions by additional CPUs, GPU, and the like. The peripheral devices may be attached either directly to the core's system bus (1048), or through a peripheral bus (1049). Architectures for a peripheral bus include PCI, USB, and the like. A graphics adapter (1050) may be included in the core (1040).

CPUs (1041), GPUs (1042), FPGAs (1043), and accelerators (1044) may execute certain instructions that, in combination, may make up the aforementioned computer code. That computer code may be stored in ROM (1045) or RAM (1046). Transitional data may be also be stored in RAM (1046), whereas permanent data may be stored for example, in the internal mass storage (1047). Fast storage and retrieve to any of the memory devices may be enabled through the use of cache memory, that may be closely associated with one or more CPU (1041), GPU (1042), mass storage (1047), ROM (1045), RAM (1046), and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture (1000), and specifically the core (1040) may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core (1040) that are of non-transitory nature, such as core-internal mass storage (1047) or ROM (1045). The software implementing various embodiments of the present disclosure may be stored in such devices and executed by core (1040). A computer-readable medium may include one or more memory devices or chips, according to particular needs. The software may cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system may provide functionality as a result of logic hardwired or otherwise embodied in a circuit (for example: accelerator (1044)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Abbreviations

AV1: AOMedia Video 1
HEVC: High Efficiency Video Coding
MVD: Motion vector difference
MVP: Motion vector prediction
VVC: Versatile Video Coding
CfL: Chroma from Luma
SDT: Semi Decoupled Tree
SDP: Semi Decoupled Partitioning
SST: Semi Separate Tree
SB: Super Block
IBC (or IntraBC): Intra Block Copy
CDF: Cumulative Density Function
SCC: Screen Content Coding
GBI: Generalized Bi-prediction
BCW: Bi-prediction with CU-level weights
CIIP: Combined intra-inter prediction
POC: Picture Order Count
DRL: Dynamic Reference List OBMC: Overlapped block motion compensation AMVD: adaptive MVD resolution AMVR: adaptive motion vector resolution JMVD: Joint coding of motion vector difference (or joint MVD coding)

MVP0: motion vector prediction for reference frame list 0

MVP1: motion vector prediction for reference frame list 1

The above disclosure also encompasses the embodiments listed below:

(1) A method performed by at least one processor of a video decoder, the method including: receiving a coded video bitstream including a current picture, a first reference picture, a second reference picture, and a joint motion vector difference (JMVD) associated with at least one block in the current picture; determining whether one or more scaling factors are used for an adaptive motion vector difference resolution (AMVD) based JMVD based on a predetermined condition; in response to determining the one or more scaling factors are used for the AMVD based JMVD, scaling the JMVD based on the one or more scaling factors; deriving a first MVD for the first reference picture based on the scaled JMVD; deriving a second MVD for the second reference picture based on the derived first MVD; and reconstructing the at least one block based on the derived first MVD and the derived second MVD.

(2) The method according to feature (1), in which in response to determining the one or more scaling factors are used for the AMVD based JMVD, the one or more scaling factors are restricted to a power of 2.

(3) The method according to feature (1), in which in response to determining the one or more scaling factors are used for the AMVD based JMVD, the one or more scaling factors include a same scaling factor for vertical and horizontal components of the JMVD.

(4) The method according to feature (3), in which the coded video bitstream further includes an index value, and in which the one or more scaling factors are determined by using a look-up-table that specifies one or more predetermined scaling factors based on the index value.

(5) The method according to feature (4), in which the one or more predetermined scaling factors include a first scaling factor for a horizontal component of the joint MVD and a second scaling factor for a vertical component of the joint MVD.

(6) The method according to feature (5), in which the first scaling factor is different than the second scaling factor.

(7) The method according to feature (6), in which one of the first scaling factor and the second scaling factor is restricted to 1, and the other of the first scaling factor and the second scaling factor is a value other than 1.

(8) The method according to feature (5), in which the determining the one or more scaling factors are used for the AMVD based JMVD is based on a flag in the coded video bitstream that indicates the one or more scaling factors are used for the AMVD based JMVD, and in which in response to determining the one or more scaling factors are used for the AMVD based JMVD, the same one or more predetermined scaling factors are applied to both horizontal and vertical components of the joint MVD.

(9) The method according to feature (1), in which the determining the one or more scaling factors are used for the AMVD based JMVD is based on a flag in the coded video bitstream that indicates the AMVD based JMVD is applied to a horizontal component of the joint MVD, and in which the AMVD based JMVD utilizes the one or more scaling factors applied to the horizontal component of the joint MVD.

(10) The method according to feature (1), in which the determining the one or more scaling factors are used for the AMVD based JMVD is based on a flag in the coded video bitstream that indicates the AMVD JMVD is applied to a vertical component of the joint MVD, and in which the AMVD based JMVD utilizes the one or more scaling factors applied to the vertical component of the joint MVD.

(11) A video decoder including: at least one memory configured to store computer program code; and at least one processor configured to access the computer program code and operate as instructed by the computer program code, the computer program code including: receiving code configured to cause the at least one processor to receive a coded video bitstream including a current picture, a first reference picture, a second reference picture, and a joint motion vector difference (JMVD) associated with at least one block in the current picture, determining code configured to cause the at least one processor to determine whether one or more scaling factors are used for an adaptive motion vector difference resolution (AMVD) based JMVD based on a predetermined condition, scaling code configured to cause the at least one processor to scale the JMVD based on the one or more scaling factors in response to determining the one or more scaling factors are used for the AMVD based JMVD, first deriving code configured to cause the at least one processor to derive a first MVD for the first reference picture based on the scaled JMVD, second deriving code configured to cause the at least one processor to derive a second MVD for the second reference picture based on the derived first MVD, and reconstructing code configured to cause the at least one processor to reconstruct the at least one block based on the derived first MVD and the derived second MVD.

(12) The video decoder according to feature (11), in which in response to determining the one or more scaling factors are used for the AMVD based JMVD, the one or more scaling factors are restricted to a power of 2.

(13) The video decoder according to feature (11), in which in response to determining the one or more scaling factors are used for the AMVD based JMVD, the one or more scaling factors include a same scaling factor for vertical and horizontal components of the JMVD.

(14) The video decoder according to feature (13), in which the coded video bitstream further includes an index value, and in which the one or more scaling factors are determined by using a look-up-table that specifies one or more predetermined scaling factors based on the index value.

(15) The video decoder according to feature (14), in which the one or more predetermined scaling factors include a first scaling factor for a horizontal component of the joint MVD and a second scaling factor for a vertical component of the joint MVD.

(16) The video decoder according to feature (15), in which the first scaling factor is different than the second scaling factor.

(17) The video decoder according to feature (16), in which one of the first scaling factor and the second scaling factor is restricted to 1, and the other of the first scaling factor and the second scaling factor is a value other than 1.

(18) The video decoder according to feature (15), in which the determining the one or more scaling factors are used for the AMVD based JMVD is based on a flag in the coded video bitstream that indicates the one or more scaling factors are used for the AMVD based JMVD, and in which in response to determining the one or more scaling factors are used for the AMVD based JMVD, the same one or more predetermined scaling factors are applied to both horizontal and vertical components of the joint MVD.

(19) The video decoder according to feature (11), in which the determining the one or more scaling factors are used for the AMVD based JMVD is based on a flag in the coded video bitstream that indicates the AMVD based JMVD is applied to a horizontal component of the joint MVD, and in which the AMVD based JMVD utilizes the one or more scaling factors applied to the horizontal component of the joint MVD.

(20) A non-transitory computer readable medium having instructions stored therein, which when executed by a processor of a video decoder cause the processor to execute a method including: receiving a coded video bitstream including a current picture, a first reference picture, a second reference picture, and a joint motion vector difference (JMVD) associated with at least one block in the current picture; determining whether one or more scaling factors are used for an adaptive motion vector difference resolution (AMVD) based JMVD based on a predetermined condition; in response to determining the one or more scaling factors are used for the AMVD based JMVD, scaling the JMVD based on the one or more scaling factors; deriving a first MVD for the first reference picture based on the scaled JMVD; deriving a second MVD for the second reference picture based on the derived first MVD; and reconstructing the at least one block based on the derived first MVD and the derived second MVD.

What is claimed is:

1. A method performed by at least one processor of a video decoder, the method comprising:
   receiving a coded video bitstream including a current picture, a first reference picture, a second reference picture, and a joint motion vector difference (JMVD) associated with at least one block in the current picture;
   determining whether one or more scaling factors are used for an adaptive motion vector difference resolution (AMVD) based JMVD based on a predetermined condition;
   in response to determining the one or more scaling factors are used for the AMVD based JMVD, scaling the JMVD based on the one or more scaling factors;
   deriving a first MVD for the first reference picture based on the scaled JMVD;
   deriving a second MVD for the second reference picture based on the derived first MVD; and
   reconstructing the at least one block based on the derived first MVD and the derived second MVD.

2. The method according to claim 1, wherein in response to determining the one or more scaling factors are used for the AMVD based JMVD, the one or more scaling factors are restricted to a power of 2.

3. The method according to claim 1, wherein in response to determining the one or more scaling factors are used for the AMVD based JMVD, the one or more scaling factors include a same scaling factor for vertical and horizontal components of the JMVD.

4. The method according to claim 3, wherein the coded video bitstream further includes an index value, and wherein the one or more scaling factors are determined by using a look-up-table that specifies one or more predetermined scaling factors based on the index value.

5. The method according to claim 4, wherein the one or more predetermined scaling factors include a first scaling factor for a horizontal component of the joint MVD and a second scaling factor for a vertical component of the joint MVD.

6. The method according to claim 5, wherein the first scaling factor is different than the second scaling factor.

7. The method according to claim 6, wherein one of the first scaling factor and the second scaling factor is restricted to 1, and the other of the first scaling factor and the second scaling factor is a value other than 1.

8. The method according to claim 5, wherein the determining the one or more scaling factors are used for the AMVD based JMVD is based on a flag in the coded video bitstream that indicates the one or more scaling factors are used for the AMVD based JMVD, and wherein in response to determining the one or more scaling factors are used for the AMVD based JMVD, the same one or more predetermined scaling factors are applied to both horizontal and vertical components of the joint MVD.

9. The method according to claim 1, wherein the determining the one or more scaling factors are used for the AMVD based JMVD is based on a flag in the coded video bitstream that indicates the AMVD based JMVD is applied to a horizontal component of the joint MVD, and wherein the AMVD based JMVD utilizes the one or more scaling factors applied to the horizontal component of the joint MVD.

10. The method according to claim 1, wherein the determining the one or more scaling factors are used for the AMVD based JMVD is based on a flag in the coded video bitstream that indicates the AMVD JMVD is applied to a vertical component of the joint MVD, and wherein the AMVD based JMVD utilizes the one or more scaling factors applied to the vertical component of the joint MVD.

11. A video decoder comprising:
    at least one memory configured to store computer program code; and
    at least one processor configured to access the computer program code and operate as instructed by the computer program code, the computer program code including:
       receiving code configured to cause the at least one processor to receive a coded video bitstream including a current picture, a first reference picture, a second reference picture, and a joint motion vector difference (JMVD) associated with at least one block in the current picture,
       determining code configured to cause the at least one processor to determine whether one or more scaling factors are used for an adaptive motion vector difference resolution (AMVD) based JMVD based on a predetermined condition,
       scaling code configured to cause the at least one processor to scale the JMVD based on the one or more scaling factors in response to determining the one or more scaling factors are used for the AMVD based JMVD,
       first deriving code configured to cause the at least one processor to derive a first MVD for the first reference picture based on the scaled JMVD,
       second deriving code configured to cause the at least one processor to derive a second MVD for the second reference picture based on the derived first MVD, and
       reconstructing code configured to cause the at least one processor to reconstruct the at least one block based on the derived first MVD and the derived second MVD.

12. The video decoder according to claim 11, wherein in response to determining the one or more scaling factors are used for the AMVD based JMVD, the one or more scaling factors are restricted to a power of 2.

13. The video decoder according to claim 11, wherein in response to determining the one or more scaling factors are used for the AMVD based JMVD, the one or more scaling factors include a same scaling factor for vertical and horizontal components of the JMVD.

14. The video decoder according to claim 13, wherein the coded video bitstream further includes an index value, and wherein the one or more scaling factors are determined by using a look-up-table that specifies one or more predetermined scaling factors based on the index value.

15. The video decoder according to claim 14, wherein the one or more predetermined scaling factors include a first scaling factor for a horizontal component of the joint MVD and a second scaling factor for a vertical component of the joint MVD.

16. The video decoder according to claim 15, wherein the first scaling factor is different than the second scaling factor.

17. The video decoder according to claim 16, wherein one of the first scaling factor and the second scaling factor is restricted to 1, and the other of the first scaling factor and the second scaling factor is a value other than 1.

18. The video decoder according to claim 15, wherein the determining the one or more scaling factors are used for the AMVD based JMVD is based on a flag in the coded video bitstream that indicates the one or more scaling factors are used for the AMVD based JMVD, and wherein in response to determining the one or more scaling factors are used for the AMVD based JMVD, the same one or more predetermined scaling factors are applied to both horizontal and vertical components of the joint MVD.

19. The video decoder according to claim 11, wherein the determining the one or more scaling factors are used for the AMVD based JMVD is based on a flag in the coded video bitstream that indicates the AMVD based JMVD is applied to a horizontal component of the joint MVD, and wherein the AMVD based JMVD utilizes the one or more scaling factors applied to the horizontal component of the joint MVD.

20. A non-transitory computer readable medium having instructions stored therein, which when executed by a processor of a video decoder cause the processor to execute a method comprising:
receiving a coded video bitstream including a current picture, a first reference picture, a second reference picture, and a joint motion vector difference (JMVD) associated with at least one block in the current picture;
determining whether one or more scaling factors are used for an adaptive motion vector difference resolution (AMVD) based JMVD based on a predetermined condition;
in response to determining the one or more scaling factors are used for the AMVD based JMVD, scaling the JMVD based on the one or more scaling factors;
deriving a first MVD for the first reference picture based on the scaled JMVD;
deriving a second MVD for the second reference picture based on the derived first MVD; and
reconstructing the at least one block based on the derived first MVD and the derived second MVD.

* * * * *